US007802632B2

(12) United States Patent
Kristen et al.

(10) Patent No.: US 7,802,632 B2
(45) Date of Patent: Sep. 28, 2010

(54) STRANDED WIRE RETAINING CHANNEL FOR AN ELECTRICAL TOOL

(75) Inventors: Ferdinand Kristen, Gilching (DE); Erwin Manschitz, Germering (DE)

(73) Assignee: Hilti Aktiengesellschaft, Schaan (LI)

(*) Notice: Subject to any disclaimer, the term of this patent is extended or adjusted under 35 U.S.C. 154(b) by 785 days.

(21) Appl. No.: 10/930,924

(22) Filed: Aug. 31, 2004

(65) Prior Publication Data

US 2005/0085124 A1 Apr. 21, 2005

(30) Foreign Application Priority Data

Sep. 1, 2003 (DE) ................................ 103 40 178

(51) Int. Cl.
*B23B 45/02* (2006.01)
*B25F 5/00* (2006.01)

(52) U.S. Cl. ........................ 173/217; 173/171; 439/577

(58) Field of Classification Search ................. 173/217, 173/162.1, 162.2; 310/50, 47; 439/577
See application file for complete search history.

(56) References Cited

U.S. PATENT DOCUMENTS

| | | | | | |
|---|---|---|---|---|---|
| 2,037,890 | A | * | 4/1936 | Dow | 173/170 |
| 2,053,720 | A | * | 9/1936 | Huck | 29/243.523 |
| 2,346,778 | A | * | 4/1944 | Mitchell | 173/170 |
| 2,976,436 | A | | 3/1961 | Anton | |
| 3,327,144 | A | * | 6/1967 | Double | 310/87 |
| 3,413,498 | A | * | 11/1968 | Bowen, III et al. | 310/47 |
| 3,414,747 | A | * | 12/1968 | Badcock | 310/50 |
| 3,414,748 | A | * | 12/1968 | Badcock | 310/50 |
| 3,676,837 | A | * | 7/1972 | Newman | 439/455 |
| 3,986,765 | A | * | 10/1976 | Shaffer et al. | 439/314 |
| 4,348,603 | A | * | 9/1982 | Huber | 310/50 |
| 4,440,238 | A | * | 4/1984 | Sauerwein et al. | 173/170 |
| 4,453,032 | A | * | 6/1984 | Rumpp et al. | 174/46 |
| 4,511,074 | A | * | 4/1985 | Kille et al. | 227/113 |
| 4,569,125 | A | | 2/1986 | Antl et al. | |
| 4,626,175 | A | * | 12/1986 | Riback et al. | 417/40 |
| 4,700,031 | A | * | 10/1987 | Claghorn et al. | 200/522 |
| 4,721,170 | A | * | 1/1988 | Rees | 173/13 |
| 4,876,797 | A | | 10/1989 | Zapata | |
| 4,930,583 | A | * | 6/1990 | Fushiya et al. | 173/109 |
| 5,172,773 | A | | 12/1992 | Meister et al. | |
| 5,179,617 | A | * | 1/1993 | Stockman | 385/136 |
| 5,651,419 | A | * | 7/1997 | Holzer et al. | 173/217 |
| 6,708,480 | B1 | | 3/2004 | Wehler | |
| 6,938,587 | B2 | * | 9/2005 | Thomas et al. | 123/41.56 |
| 7,137,761 | B2 | * | 11/2006 | Hara et al. | 408/16 |
| 7,138,595 | B2 | * | 11/2006 | Berry et al. | 200/522 |

(Continued)

FOREIGN PATENT DOCUMENTS

| | | | |
|---|---|---|---|
| EP | 0129754 | A1 | 1/1985 |

(Continued)

*Primary Examiner*—Rinaldi I. Rada
*Assistant Examiner*—Lindsay Low
(74) *Attorney, Agent, or Firm*—Abelman, Frayne & Schwab

(57) ABSTRACT

An electrical tool includes a housing, a conductor channel, and a stranded conductor. The housing includes a motor, electronics, and drive gear. The conductor channel has a flexible section and a rigid section. The stranded conductor is in a receptacle of the conductor channel. One end of the stranded conductor is connected to a conductor of a network cable of the electrical tool. Another end of the stranded conductor is conductively connected with a component of the electrical tool.

13 Claims, 3 Drawing Sheets

U.S. PATENT DOCUMENTS

| | | | | |
|---|---|---|---|---|
| 2004/0108124 | A1* | 6/2004 | Kristen et al. | 173/217 |
| 2005/0207191 | A1* | 9/2005 | Kaminski | 363/63 |
| 2005/0273085 | A1* | 12/2005 | Hinman et al. | 606/1 |
| 2008/0085178 | A1* | 4/2008 | Baba | 414/744.3 |

FOREIGN PATENT DOCUMENTS

| | | | | |
|---|---|---|---|---|
| GB | 2011576 | A | | 7/1979 |
| WO | WO-02-103854 | | * | 12/2002 |

* cited by examiner

STRANDED WIRE RETAINING CHANNEL FOR AN ELECTRICAL TOOL

BACKGROUND OF THE INVENTION

1. Field of the Invention

The present invention relates to an electrical tool, in particular, to an electric motor-driven, hand-held tool having a network connection and a housing. In the housing, at least one component of the tool such as a motor, electronics, and/or a drive gear is arranged. In the housing, there is further arranged a stranded conductor one end of which is connected with the conductor of the network cable and the second end of which is connected to a component of the electrical tool.

2. Description of the Prior Art

Electrical tools, in particular, electric motor-driven, hand-held tools such as, e.g., drills are fed with current via a network cable. The network cable is inserted in the electrical tool housing, and separate stranded conductors connect separate conductors of the network cable with corresponding components of the electrical tool located in the housing. In this way, e.g., the current-feeding conductors of the network cable are connected by the stranded conductors with corresponding connectors which are provided on the motor, the electronics, etc., supplying current to these components which are located in the electrical tool housing.

In electrical tools without a vibration-reducing device, the stranded conductors are held with separate retaining elements or freely hang in the housing without any fixation. A drawback of this arrangement consists in that during the final assembly of the housing parts, the stranded conductors can be pinched or even damaged. In case a large number of retaining elements is provided in the housing for securing the stranded conductors, the mounting of the conductors becomes very expensive.

Other electrical tools have, for reduction of vibrations, e.g., a motor-drive gear-percussion mechanism system which is swingingly supported in the housing relative to an outer housing. For accommodating the swingings or oscillation of the vibration-reducing system, the stranded conductors, which are arranged in the housing, are provided with a sufficient length. At that, the stranded conductors are either secured with fewer retaining members or are simply freely arranged in the housing without any fixation. A drawback of such arrangement of the stranded conductors consists in that during the final assembly of the housing parts, the stranded conductors can be pinched or even be damaged.

An object of the present invention is to provide an electrical tool with which a danger of the stranded conductors being damaged during the final assembly of the housing parts is eliminated, and which would meet specific requirement of pertinent codes of different countries.

SUMMARY OF THE INVENTION

This and other objects of the present invention, which will become apparent hereinafter, are achieved by providing an electrical tool having at least one stranded conductor which is arranged in a receptacle of a conductor channel having at least one flexible section and a rigid section.

The conductor channel protects the stranded conductor from any damage during the assembly of the housing parts, on one hand, and on the other hand, permits to easily position the stranded conductor in the tool housing. The rigid section of the conductor channel provides for a desired alignment of the stranded conductor in the housing. The flexible section permits to use the same type of the conductor channel in different electrical tools as the alignment of the stranded conductor during mounting can be easily adapted to the particularities of a respective electrical tool. Overall, the conductor channel noticeably improves the use fitness of the stranded conductor in comparison with conventional arrangements.

To provide for feeding current to components of an electrical tool arranged in the tool housing, e.g., two stranded conductors can be arranged in the receptacle of the conductor channel which is then mounted in the housing of the electrical tool. Finally, respective first ends of the conductors are connected with the current-feeding conductors of the network cable, and opposite respective second ends of the conductors are connected with respective tool components. According to one embodiment of the invention, firstly, the conductor channel is secured in the housing, and then the stranded conductors are placed in the conductor channel receptacle and are, thus, secured in the housing of the electrical tool. In this embodiment, the stranded conductors can be connected with the respective component of the electrical tool and with the respective conductor of the network cable before being mounted in the conductor channel.

In case the electrical tool includes a vibration-reducing device swingingly supported in the housing, the flexible section of the conductor channel compensates the oscillating movements by respectively accommodating the movements of the stranded conductor located therein. The conductor channel protects the stranded conductor(s) from different outside influences to a most possible extent, which noticeably improves the working life of the conductor(s) and its(their) use fitness in comparison with conventional arrangements. The flexible section also prevents breaking of the conductor off and reduces the danger of loosening of the conductors at their connection points.

Advantageously, the stranded conductor is formed as a protective stranded conductor, a first end of which is connected with a protective conductor of the network cable, and a second end of which is connected to a metal part of the at least one of the motor, electronics, and drive gear which are arranged in the housing. In some countries, e.g., in the U.S.A. an electrical tool and, in particular, an electric motor-driven hand-held tool should be equipped with a protective or grounding conductor. The protective or grounding conductor of the network cable is connected by the stranded conductor with a metal part of the electrical tool (e.g., motor, drive gear, or percussion mechanism) with the stranded conductor functioning as a protective conductive connection from the electrical tool to the protective or grounding conductor. Thereby, the severe conditions of security of the network or main line can be relaxed.

Advantageously, the conductor channel is formed as a one-piece part. The logistic expenses, which are associated with the mounting of the conductor channel, are thereby significantly reduced and are much smaller than when the conductor channel is formed of several separate parts. Preferably, there are provided only few embodiments of the conductor channels which can be cut to a desired size, as needed.

Advantageously, the flexible section is formed by slot-shaped recesses formed in the conductor channel, though other shapes of the recesses can be used. The recesses and their spacing from each other so weaken the cross-section of the conductor channel that the flexible section can be bent in different directions, remaining at the same time sidewise formstable as a chain.

Advantageously, there is provided, in the conductor channel, a plurality of retaining elements for securing the stranded conductor at several points along the conductor channel. The retaining elements prevent sliding of the stranded conductor out of the conductor channel to a most possible extent. The number of the retaining members in a conductor channel is selected based essentially on a load applied to the setting tool.

Advantageously, the conductor channel has a first connector for connecting the conductor channel to the housing, and a second connector for connecting the conductor channel to the component of the electrical tool with which the another end of the at least one stranded conductor is connected. Because the conductor channel is connected to both the housing and a component of the electrical tool located in the housing, the stranded conductor, which is arranged in the conductor channel receptacle and, in particular, its connection regions are subjected to smaller dynamic loads.

Advantageously, the stranded conductor forms a component of the conductor channel. In this embodiment, the conductor channel forms with the stranded conductor a technological unit, whereby the stranded conductor is protected from damage in a best possible way. The stranded conductor preferably projects outwardly beyond a free end of the conductor channel to insure connection of the stranded conductor with corresponding parts. At the first, housing side, connector of the conductor channel, the stranded conductor is connected, e.g., by a connector box with a corresponding conductor of the network cable. At the second, component side, connector of the conductor channel, the stranded conductor is connected, e.g., with a corresponding connection section to the corresponding tool component. If the stranded conductor is a protective conductor, its second end is connected fixedly with the second connector of the conductor channel, with the second connector being conductively connected with a metal part of the motor, the drive gear, or the percussion mechanism.

Advantageously, the first connector is formed as hook means that engage respective receiving means provided on or in the tool housing. The hook means comprises, e.g., hooks which are inserted in correspondingly formed recesses that constitute the receiving means. The first connector of the conductor channel is formed on the free end of the rigid section of the conductor channel or is arranged thereon, as the case may be, with the rigid section being held in a predetermined alignment. Advantageously, the first connector is mounted without substantially any possibility of rotation, which prevents an undesirable movement of the conductor channel.

Advantageously, the second connector of the conductor channel is formed as a connection eyelet. The connection eyelet is used for connection of the conductor channel with the component of the electrical tool, or to a metal part of the component, or for insertion in a receptacle provided on the component. According to a modified embodiment, the connection eyelet has an opening through which a fastening element, e.g., a screw passes for securing the connection eyelet on the component or its metal part. Advantageously, the second connector also includes a star washer. The star washer insures the conductor channel is precisely secured to the component or a metal part thereof at a desired location.

Advantageously, the conductor channel has, at least regionwise, an L-shaped cross-section, such that a satisfactory fixation of the at least one stranded conductor in the conductor channel is insured. In addition, with a plurality of incisions in one leg of the L-shaped cross-section, a flexible section of the conductor channel can be formed. As a variant, the conductor channel can have a U-shaped cross-section. To form a flexible section of the conductor channel, at least two, preferably, adjacent sections of the U-shaped cross-section are provided with several, spaced from each other, recesses such as e.g., cuts-in.

Advantageously, the conductor channel is formed of a plastic material. For forming the conductor channel, preferably, non-conducting plastic base material is used. With, e.g., an injection-molding process, the conductor channel can be produced as one piece with a desired shape in one step.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
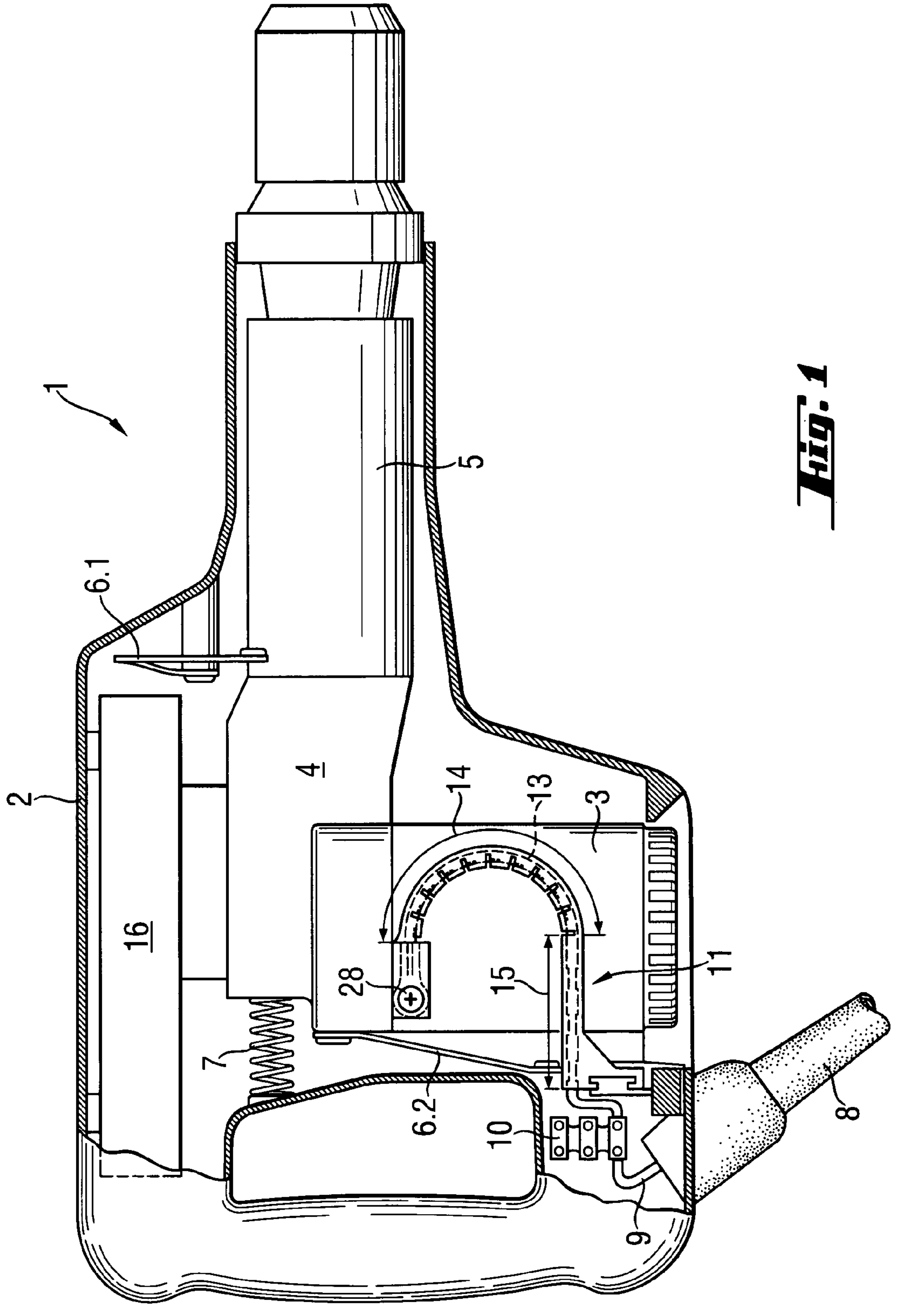
FIG. 1 a partially cross-sectional view of an electrical tool according to the present invention with a conductor channel.
Figure 2:
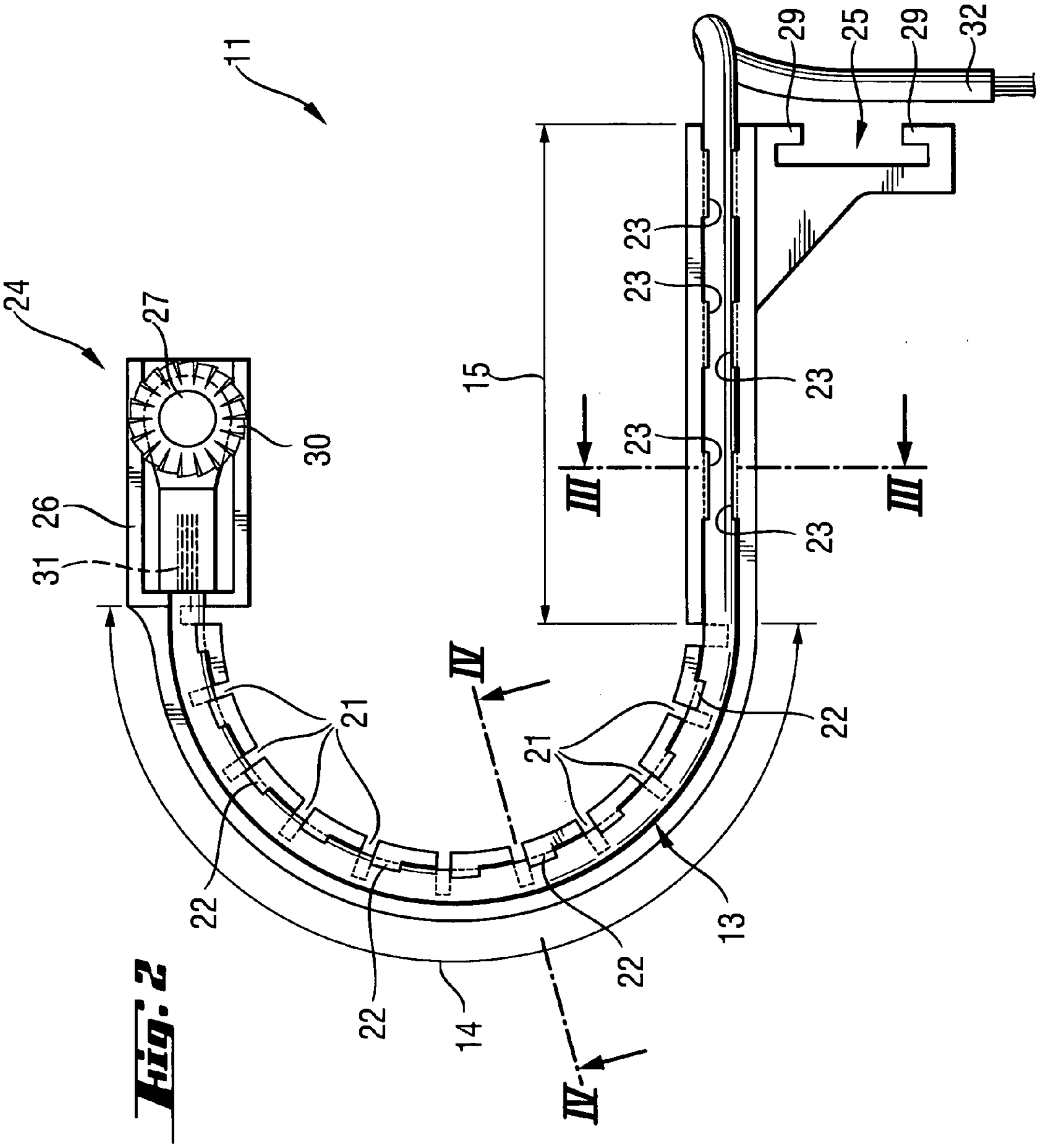
FIG. 2 a rear view of the conductor channel.
Figure 4:
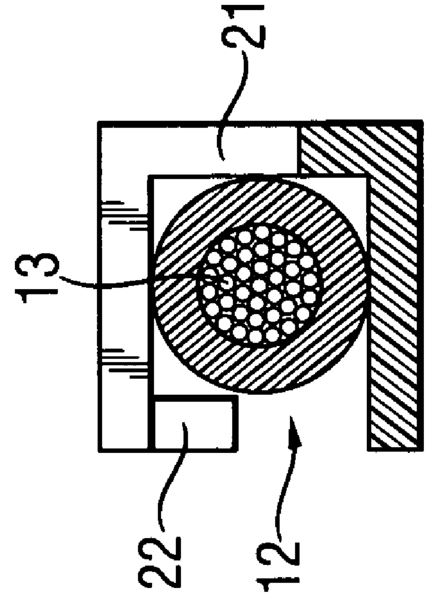
FIG. 4 a cross-sectional view along line IV-IV in FIG. 2.
Figure 3:
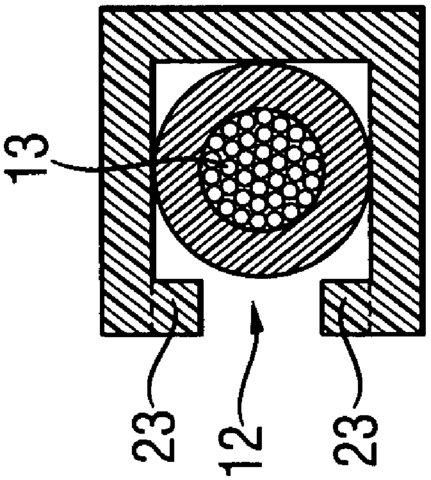
FIG. 3 a cross-sectional view along line III-III in FIG. 2.

FIGS. 1-4 of the drawings show an electrical tool according to the present invention which is electrically protected with a protective stranded conductor. The below discussed arrangement of the protective stranded conductor is substantially equally applicable to the arrangement of stranded conductors for feeding current to components located in the housing of an inventive electrical tool.

An electrical tool 1, which is formed as a drill, has a housing 2, a motor 3, electronics 16, drive gear 4, and a percussion mechanism 5 all located in the housing 2. The motor 3, the electronics 16, the gear 4, and the percussion mechanism 5 are combined in a unit and are pivotally supported in the housing 2 with a first hinged frame 6.1, a second hinged frame 6.2, and compression spring 7 which together form a device for reducing vibrations. The motor 3 is provided with current via a network cable 8 having a protective conductor 9.

For protection of the electrical tool 1, a conductor channel 11 is formed in the housing 2. The conductor channel 11 has a receptacle 12 for a protective stranded conductor 13. The protective stranded conductor 13 is connected, on one hand, to the metal housing of the motor 3 and, on the other hand, with the protective conductor 9 of the network cable 8. A connector box 10 connects the protective stranded conductor 13 with the protective conductor 9. The conductor channel 11 is formed as a single part and has a flexible section 14 and a rigid section 15 that directly adjoins the flexible section 14. The cross-section of the conductor channel 11 shown in FIG. 4 runs through the flexible Section IV-IV in FIG. 2.

In order to provide the flexible section 14, a substantially U-shaped cross-section of the conductor channel 11 is repeatedly weakened with a plurality of the slot-shaped recesses 21 in such a way that the flexible section 14 remains flexible but nevertheless stable as a chain. For securing the protective stranded conductor 13, there are provided, in the receptacle 12 of the conductor channel 11 in the region of the flexible section 14, a plurality of first retaining members 22 formed as projecting noses, and in the region of the rigid section 15, there are provided a plurality of second retaining members 23 likewise formed as projecting noses.

The conductor channel 11 is formed of a plastic material by an injection-molding process, with separate elements of the conductor channel 11 being formed in the mold.

The conductor channel 11 has a first connector 25 for connecting the conductor channel 11 to the housing 2, and a second connector 24 for connecting the conductor channel 11 to a metal component of the electrical tool 1, to the motor 3 in the embodiment shown in the drawings. The first connector 25 has two hooks 29 insertable in corresponding recesses formed in the housing 2. The second connector 24 of the conductor channel 11 includes a connection eyelet 26 provided with an opening 27 for passing of a screw 28 therethrough. The screw 28 secures the conductor channel 11 to the motor 3. For aligning of the connection eyelet 26 and for positioning it on the motor 3, there is provided, between the connection eyelet 26 and the outer wall of the motor 3, a star washer 30.

The protective stranded conductor 13 is arranged on working side of the conductor channel 11. An end 32 of the protective stranded conductor 13 projects beyond the free end of the conductor channel 11 so that it can be connected with the protective conductor 9 of the network cable 8 after mounting of the conductor channel 11 in the electrical tool 1. The opposite end 31 of the protective stranded conductor 13 is fixedly connected with the connection eyelet 26.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An electrical tool comprising a drive gear (4) for driving a working tool; an electric motor (3) for driving the drive gear (4); a network cable (8) for feeding power to the electrical tool; at least one stranded conductor (13) having one end thereof connected with a conductor of the network cable (8) and another end thereof connected with a component of the electrical tool (1); and a conductor channel (11) for protecting the at least one stranded conductor (13) and having a flexible channel section (14) and a rigid channel section (15) arranged one after another in a longitudinal direction of the at least one stranded conductor (13), the at least one stranded conductor (13) extending through both the flexible and rigid sections (14, 15), wherein the flexible section (14) is formed by slot-shaped recesses (21) formed in the conductor channel (11) and extending perpendicular to a longitudinal extent of the conductor channel (11).

2. An electrical tool according to claim 1, wherein the component of the electrical tool (1) is located in a tool housing (2) and is formed of one of the motor (3), the drive gear (4), and electronics (16), and wherein the protecting conductor channel (11) is located in the housing (2) remotely from a tool handle.

3. An electrical tool according to claim 1, wherein the protecting conductor channel (11) is formed as a one-piece part.

4. An electrical tool according to claim 3, wherein the protecting conductor channel (11) is formed of a plastic material by an injection-molding process.

5. An electrical tool according to claim 3, wherein the protecting conductor channel (11) is formed as a U-shaped member a cross-section of which extends transverse to a longitudinal extent of the at least one stranded conductor (13).

6. An electrical tool according to claim 1, wherein the conductor channel (11) is provided with retaining members (22, 23) arranged therein along an entire length of the conductor channel for securing the at least one stranded conductor in the conductor channel (11).

7. An electrical tool according to claim 2, wherein the protecting conductor channel (11) has a first connector (25) provided at an end of the rigid channel section (15) remote from the flexible channel section (14) for connecting the conductor channel (11) to the tool housing (2), and a second connector (24) provided at an end of the flexible channel section (14) remote from the rigid channel section (15) for connecting the conductor channel (11) to the component of the electrical tool.

8. An electrical tool comprising a drive gear (4) for driving a working tool; an electric motor (3) for driving the drive gear (4); a network cable (8) for feeding power to the electrical tool; at least one stranded conductor (13) having one end thereof connected with a conductor of the network cable (8) and another end thereof connected with a component of the electrical tool (1); and a conductor channel (11) for protecting the at least one stranded conductor (13) and having a flexible channel section (14) and a rigid channel section (15) arranged one after another in a longitudinal direction of the at least one stranded conductor (13), the at least one stranded conductor (13) extending through both the flexible and rigid sections (14, 15), wherein the conductor channel (11) is provided with retaining members (22, 23) arranged therein along an entire length of the conductor channel for securing the at least one stranded conductor in the conductor channel (11).

9. An electrical tool according to claim 8, wherein the component of the electrical tool (1) is located in a tool housing (2) and is formed of one of the motor (3), the drive gear (4), and electronics (16), and wherein the protecting conductor channel (11) is located in the housing (2) remotely from a tool handle.

10. An electrical tool according to claim 8, wherein the protecting conductor channel (11) is formed as a one-piece part.

11. An electrical tool according to claim 9, wherein the protecting conductor channel (11) is formed of a plastic material by an injection-molding process.

12. An electrical tool according to claim 9, wherein the protecting conductor channel (11) is formed as a U-shaped member, a cross-section of which extends transverse to a longitudinal extent of the at least one stranded conductor (13).

13. An electrical tool according to claim 9, wherein the protecting conductor channel (11) has a first connector (25) provided at an end of the rigid channel section (15) remote from the flexible channel section (14) for connecting the conductor channel (11) to the tool housing (2), and a second connector (24) provided at an end of the flexible channel section (14) remote from the rigid channel section (15) for connecting the conductor channel (11) to the component of the electrical tool.

* * * * *